United States Patent [19]

Grace

[11] Patent Number: 4,651,271

[45] Date of Patent: Mar. 17, 1987

[54] POWER SUPPLY HAVING TUNED RADIO FREQUENCY CIRCUIT

[75] Inventor: Alan G. V. Grace, Redwood City, Calif.

[73] Assignee: Power Modifications Incorporated, Hayward, Calif.

[21] Appl. No.: 727,180

[22] Filed: Apr. 25, 1985

[51] Int. Cl.⁴ .............................................. H02P 13/20

[52] U.S. Cl. ........................................ 363/98; 363/132

[58] Field of Search .................... 363/97, 98, 131, 132; 315/DIG. 5, DIG. 7; 323/244, 289

[56] References Cited

U.S. PATENT DOCUMENTS 4,493,017 1/1985 Kammiller et al. ................. 323/289

FOREIGN PATENT DOCUMENTS 2551150 5/1977 Fed. Rep. of Germany ........ 363/97

2100078A 12/1982 United Kingdom .

2130823 6/1984 United Kingdom .................. 363/97

OTHER PUBLICATIONS

NASA, "Frequency-Controlled Voltage Regulator", NASA Tech Briefs, Summer 1980.

*Primary Examiner*—Peter S. Wong
*Assistant Examiner*—Judson H. Jones
*Attorney, Agent, or Firm*—Townsend and Townsend

[57] ABSTRACT

A tuned circuit radio frequency power supply is disclosed. A conventional voltage doubler drives a power oscillator having a variable output frequency and variable duty cycle. The power oscillator output is connected to a tuned RLC circuit incorporating a load. A voltmeter coupled to the circuit measures overall phase of the RLC circuit and inputs to a phase comparator within the oscillator. Tuning of the RLC circuit is done by frequency comparison with circuit lead requiring increased oscillator frequency and circuit lag requiring decreased oscillator frequency. An ammeter is placed in series with the neon circuit and controls the oscillator duty cycle to maintain constant current despite changes in load. Consequently, power is adjusted from the oscillator, preferably by varying trigger level on a ramp voltage generator. In the case of a neon lamp power supply, there results a light weight power supply having a small radio frequency inductance which strikes the neon lamp, maintains the neon lamp at minimum energy levels, adjusts the lamp to various changes in operating parameters and lessens fire danger and minimizes radio frequency interference. In the case of conventional power supplies there is a power supply which does not require choking, has low switching losses and utilizes a small and compact step-down transformer as illustrated.

9 Claims, 15 Drawing Figures

FIG._3A.
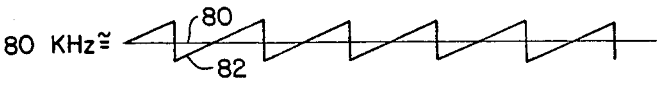
FIG._3B.
FIG._3C.
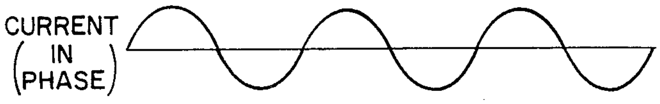
FIG._3D.
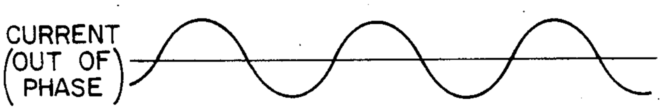
FIG._3E.
FIG._6A.
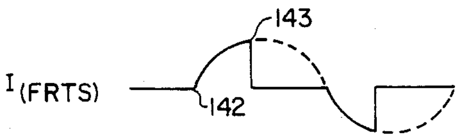
FIG._6B.
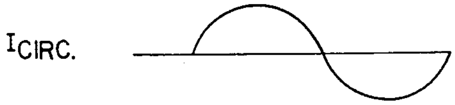
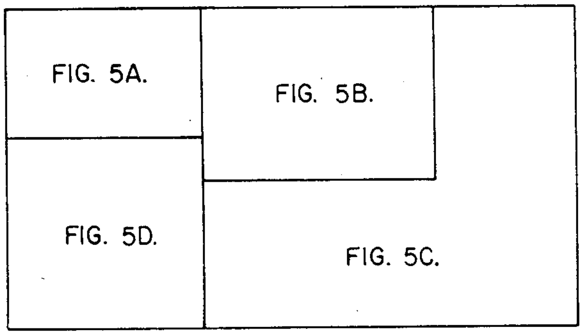
FIG._5.

POWER SUPPLY HAVING TUNED RADIO FREQUENCY CIRCUIT

BACKGROUND OF THE INVENTION

This invention relates to power supplies and more specifically a radio frequency tuned power supply for powering loads such as neon signs.

STATEMENT OF THE PRIOR ART

Low voltage input and high voltage output power supplies, such as transformers commonly used for neon signs, are increasingly unsuitable for modern use. Typically, such power supplies step up the voltages at line frequencies. Transformers include magnetic losses and often utilize magnetic choking with the result that considerable heat energy is generated and must be dissipated.

High voltage generated at line frequencies is dangerous. The voltage penetrates when conducting. When shorted the penetrating voltage burns and causes fires. This is well known.

When used to drive neon light sources, high voltage at line frequencies generates both conductive radio frequency noise and broadcast radio frequency noise. The mechanism by which this occurs includes the 240 Hz striking and extinguishment of neon. With alternating current, neon stops illuminating or firing in approximately one millisecond. When a neon light tube is supplied with power at 60 Hz, a 16 millisecond cycle results. Observable flicker occurs. The resultant interference comes from the switching which occurs as the neon is successively lit and thereafter extinguished. It is rather clear that if neon lighting was offered with its present power sources as a "new" lighting apparatus and method, it would be rejected as failing to meet required radio frequency standards.

It is also known that the switching decreases electrode life and, hence, tube life. Observable electrode etching results from this switching effect.

Conventional switching power supplies also have difficulty. Switches open and close generating square wave forms with undesired harmonics. Large switching losses are present. Choking is required for energy storage and desired DC output. Diodes have a hostile reverse recovery environment; consequently, only expensive diodes with short recovery times may be used.

SUMMARY OF THE INVENTION

A tuned circuit radio frequency power supply is disclosed. A conventional voltage doubler drives a power oscillator having a variable output frequency and variable duty cycle. The power oscillator output is connected to a tuned RLC circuit incorporating a load. A voltmeter coupled to the circuit measures overall phase of the RLC circuit and inputs to a phase comparator within the oscillator. Tuning of the RLC circuit is done by frequency comparison with circuit lead requiring increased oscillator frequency and circuit lag requiring decreased oscillator frequency. An ammeter is placed in series with the neon circuit and controls the oscillator duty cycle to maintain constant current despite changes in load. Consequently, power is adjusted from the oscillator, preferably by varying trigger level on a ramp voltage generator. In the case of a neon lamp power supply, there results a light weight power supply having a small radio frequency inductance which strikes the neon lamp, maintains the neon lamp at minimum energy levels, adjusts the lamp to various changes in operating parameters and lessens fire danger and minimizes radio frequency interference. In the case of conventional power supplies there is a power supply which does not require choking, has low switching losses and utilizes a small and compact step-down transformer.

OTHER OBJECTS, FEATURES AND ADVANTAGES OF THIS INVENTION

An object of this invention is to use an RLC circuit drive as a power supply for a load. According to this aspect of the invention, a power oscillator having variable duty cycle and variable frequency outputs in the range of 40 kHz to an RLC circuit. The circuit includes two reactive elements, these elements being an inductor and a capacitor. An oscillating power supply drives the circuit. Frequency and duty cycle are adjusted at the oscillator to maintain the circuit tuned and the current constant through the load.

An advantage of the disclosed circuit is that voltage is controlled through oscillator frequency independent of the load.

A further advantage is that load current is controlled through circuit duty cycle, independent of circuit voltage.

An additional advantage is that this circuit can be used for multiple loads including powering of neon lights at high voltage to conventional power supplies at low voltage.

An advantage of this power supply is that it is readily adapted to neon lamps.

A further advantage of this power supply is that modification to a 200 kHz power supply is possible. Computer and computer peripherals can readily use the disclosed power supply design.

An advantage of the invention is that it can be used as a radio frequency power for driving a neon tube. Given a short circuit condition, the radio frequency power is a surface conductor; penetration of the generated power is vastly reduced. Resultant fire danger is correspondingly reduced.

An additional advantage of this invention is that the frequency of alternation is greater than the one millisecond extinguishment time of electrically excited neon. This being the case, the powered neon lamp continuously glows. This continuous glow does away with radio frequency effect experienced at high voltage line frequency power supplies. Both conductive radio interference and radiated radio interference are vastly reduced or eliminated.

An additional object of this invention is to disclose an apparatus and method for tuning an RLC circuit including a load such as a neon lamp. According to this aspect of the invention, the voltage of the oscillator is compared to the voltage in the circuit. Where the reactance of the circuit produces an overall voltage component that lags the oscillator voltage, the frequency is increased to tune the circuit. Where the reactance of the circuit produces an overall voltage component that leads that of the oscillator circuit, the frequency is decreased. Automated tuning of the power supply results for minimum conduction with maximum power delivery.

An advantage of this invention is that it is dynamically tuned to the varying parameters encountered in load operation, especially lighting loads in neon tubes. For example, where temperatures change or operating parameters within the neon change, the circuit will automatically adjust.

Yet a further object of this invention is to disclose an adjustable duty cycle for forcing constant current through a load, such as a neon tube. Accordingly, in series with the neon load there is placed an ammeter. This ammeter is connected to a duty cycle control at the oscillator. The duty cycle is varied to assure constant current through a connected neon load. Where the load is a long neon tube and the voltage must increase by the required 1200 volts per foot of a neon tube, duty cycle of the power supply is increased. The power supply matches up to full capacity any length neon load driven by the power supply.

An advantage of this aspect of the invention is that different power supplies are not required for different neon loads. Matching of an entire vocabulary of power supplies is not required, as in the case of present line frequency, high voltage neon power transformers and power supplies.

It will be understood by the reader that the duty cycle control and phase control are interrelated and cooperate especially in the case of a neon load. This cooperation achieves many advantages.

A first advantage is that the power supply automatically drives to strike voltage a neon sign and thereafter maintains the voltage at a maintenance voltage.

A second advantage is that when the voltage is maintained at the maintenance voltage, current flow can be tailored to the most energy efficient portion of a neon lighting curve.

Yet another advantage of the disclosed circuit is that it is adaptable. It is adaptable to various lengths of neon connected. It is adaptable to various changes in operating parameters. These changes in operating parameters can include temperature extremes, changes in tube age and other load operating parameters. Moreover, a relatively wide fluctuation in driving line voltages. For example, 80 volts AC to 150 volts AC will produce satisfactory output.

Yet a further advantage of this invention is that the required mass of the power supply is vastly reduced. No longer is a large specially tailored conductive core required. Since the requirement for core size is inversely proportional to frequency, a comparatively small core utilized with the disclosed inductor is sufficient for the radio frequencies used.

Yet another advantage of this invention is that neon light length is increased. Typically, there is an on and off "flicker" adjacent the anode and cathode at the extreme ends of neon tubes. This anode and cathode flicker causes electrode etching and premature aging when line frequency high voltage power supplies are used. With the present invention, because of the constant glow provided to the neon, electrode etching is reduced or eliminated. Tube life is vastly increased.

An additional advantage of the disclosed power supply is that it can be used for conventional low voltage loads. According to this aspect, a transformer is placed in series with reactive elements. Voltage out is typically controlled by modifying the duty cycle.

An advantage of this aspect of the invention is that a power supply having a sine wave driving power source is disclosed. Noise generated by square wave switching devices is absent.

A further advantage is that the power supply includes a tuned sine wave drive. This tuned sine wave drive is power efficient. Switching losses are minimized. Diodes with relatively long recovery times may be used.

Other objects, features and advantages of this invention will become more apparent after referring to the following investigation and attached drawings in which:

FIGS. 3A–3E are a timing diagrams in which

FIG. 3A illustrates ramp voltage output;

FIG. 3B illustrates resultant power oscillator squarewave output;

FIG. 3C plots the in-phase of voltage from the voltage oscillator with the voltage being reduced to a sine format;

FIG. 3D shows the voltage in the RLC circuits; and

Figures 1, 2, 4:
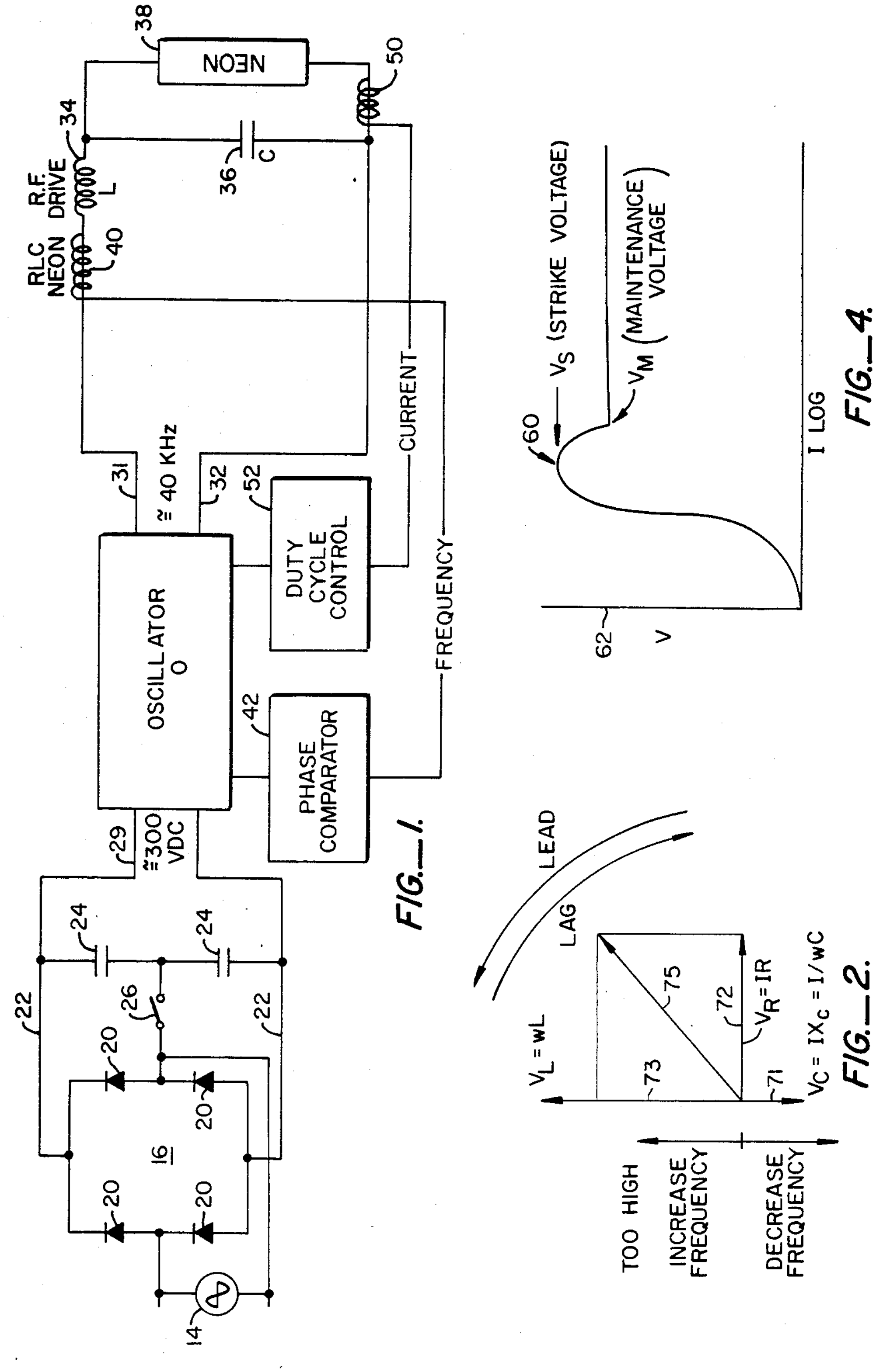
FIG. 1 is a schematic diagram illustrating the key elements of this invention including the frequency doubler, power supply with full wave rectification oscillator and the RLC circuit, this circuit here shown with the power supply preferred neon load thereon.
FIG. 2 is a conventional reactance diagram of inductive and capacitive vectors with overall circuit reactance being shown in a vector format in a condition of lead.
Figure 5A:
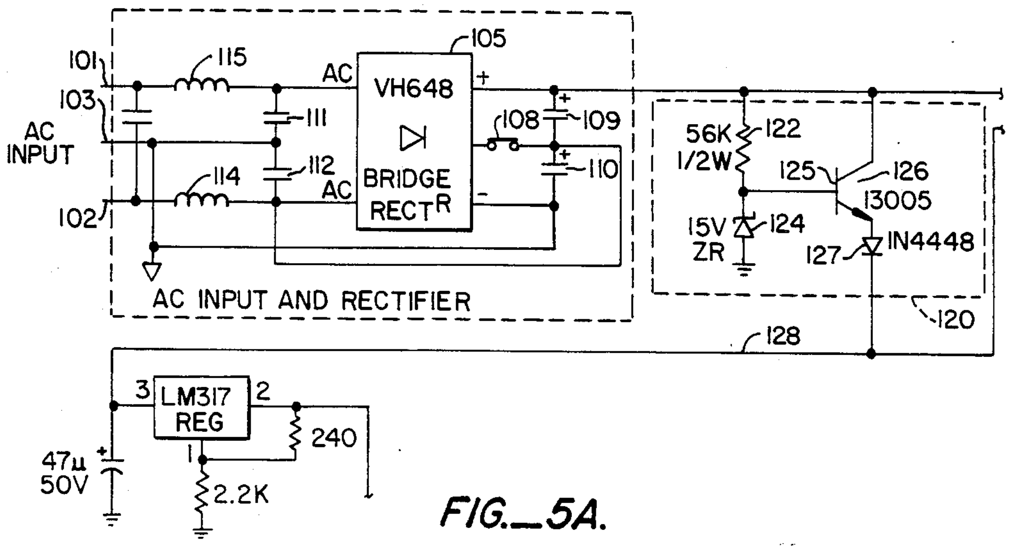
Figure 5D:
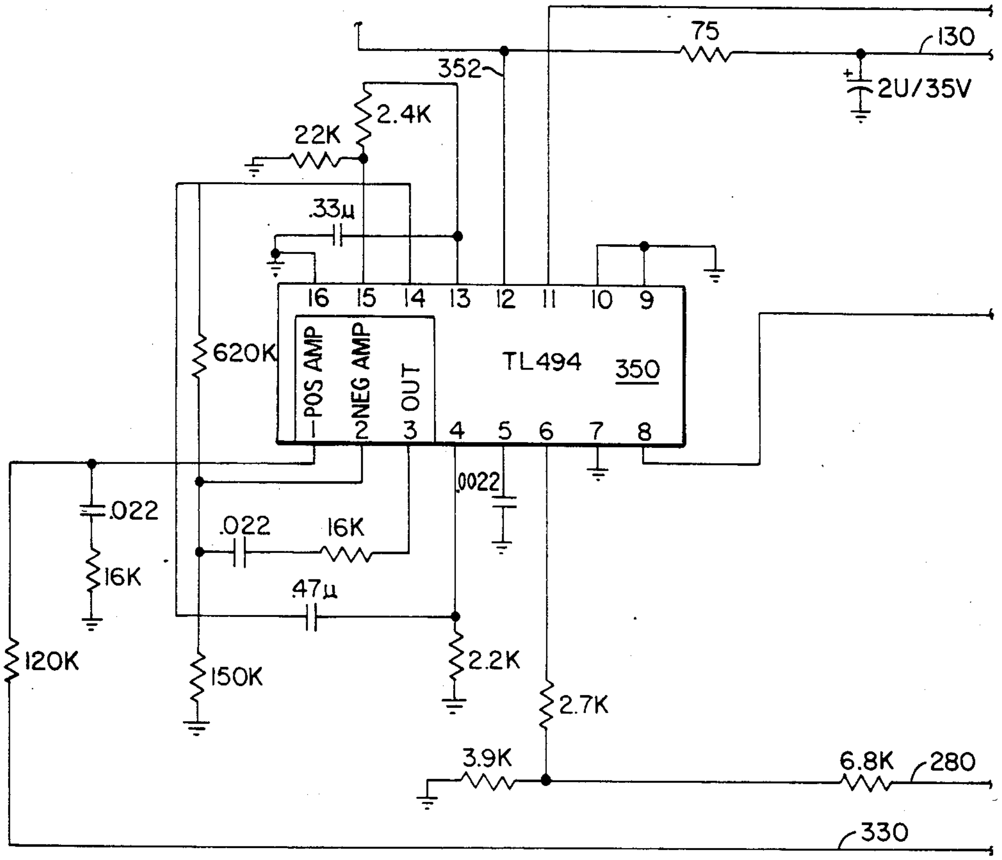
Figure 5B:
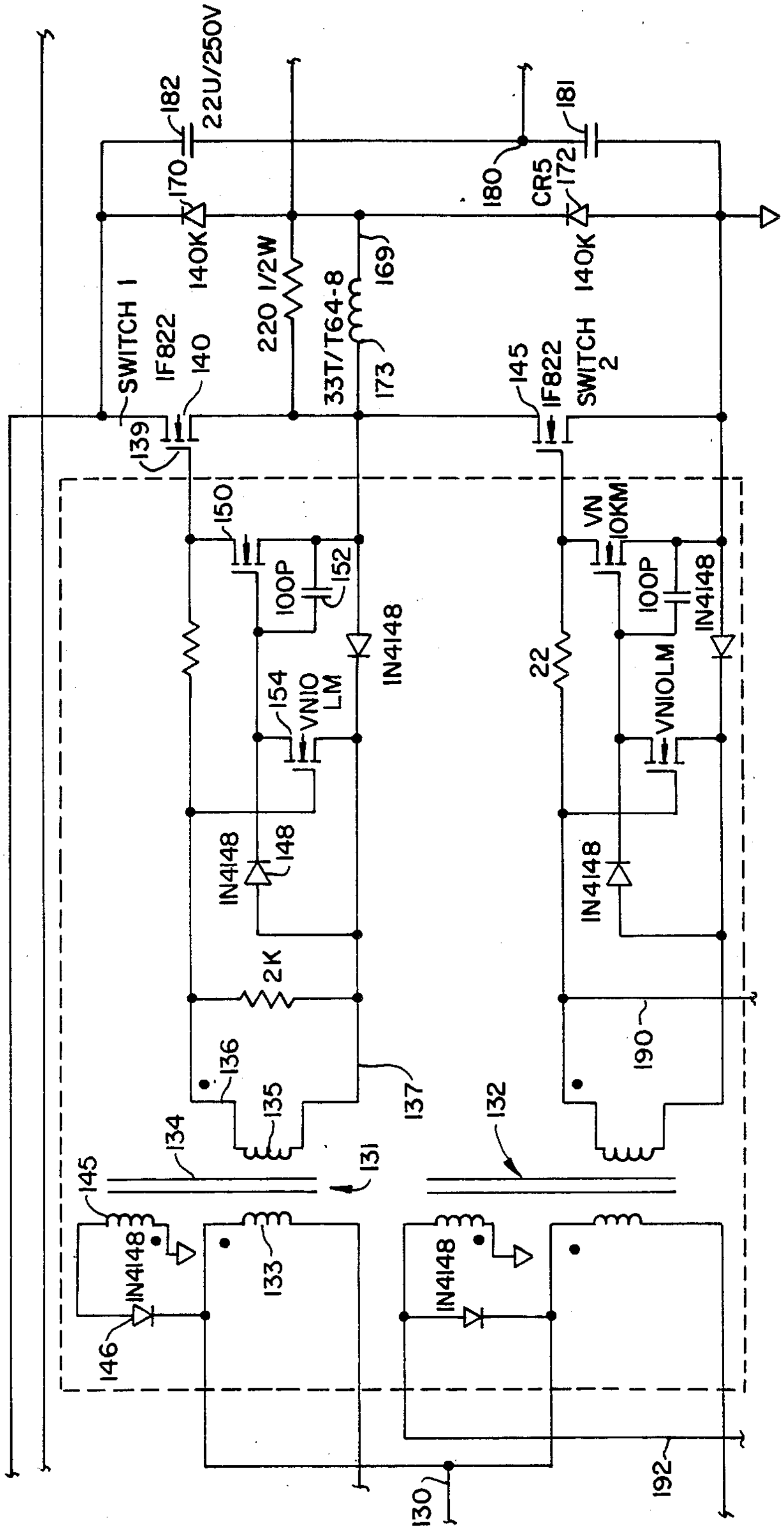
Figure 5C:
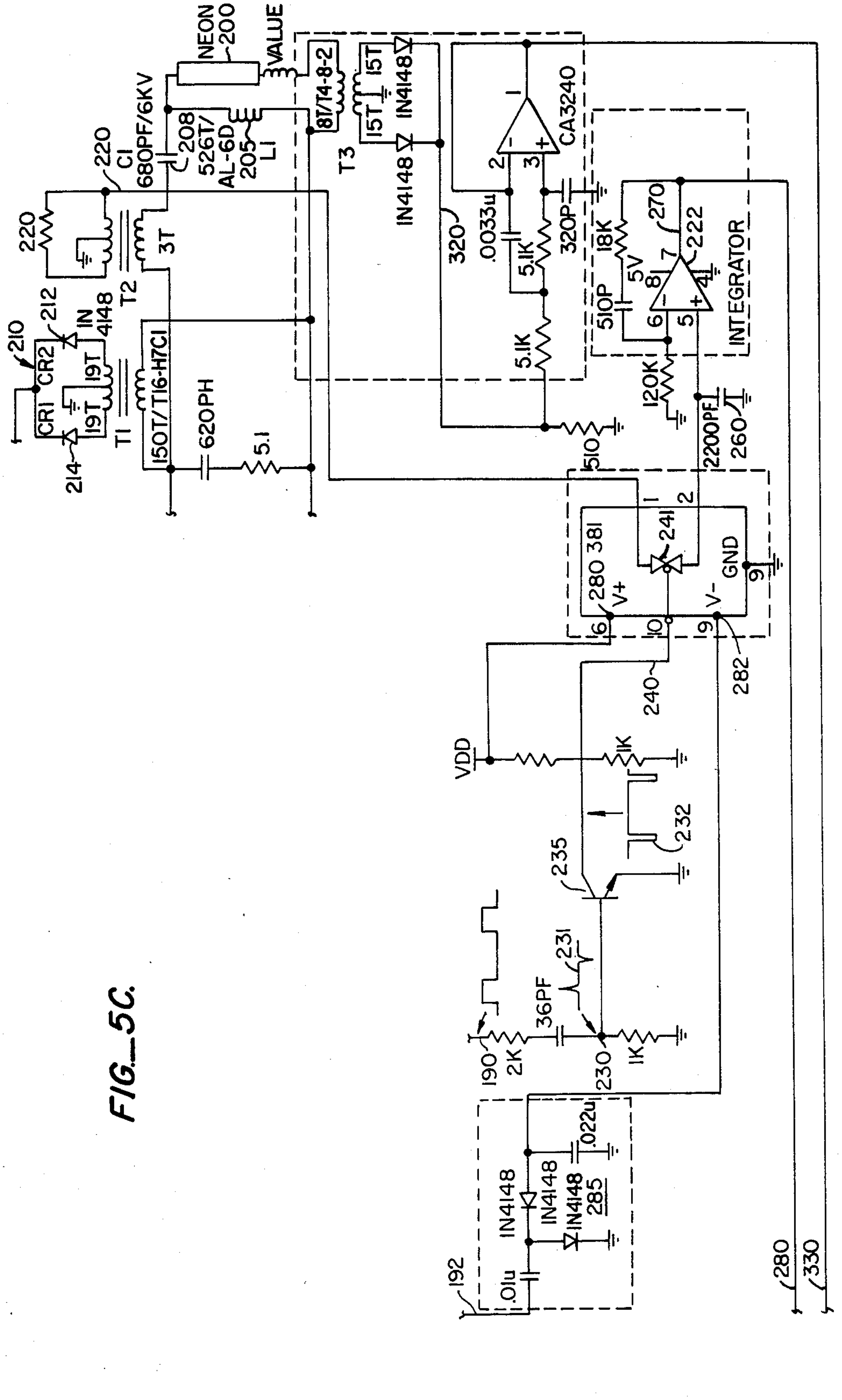
Figure 7:
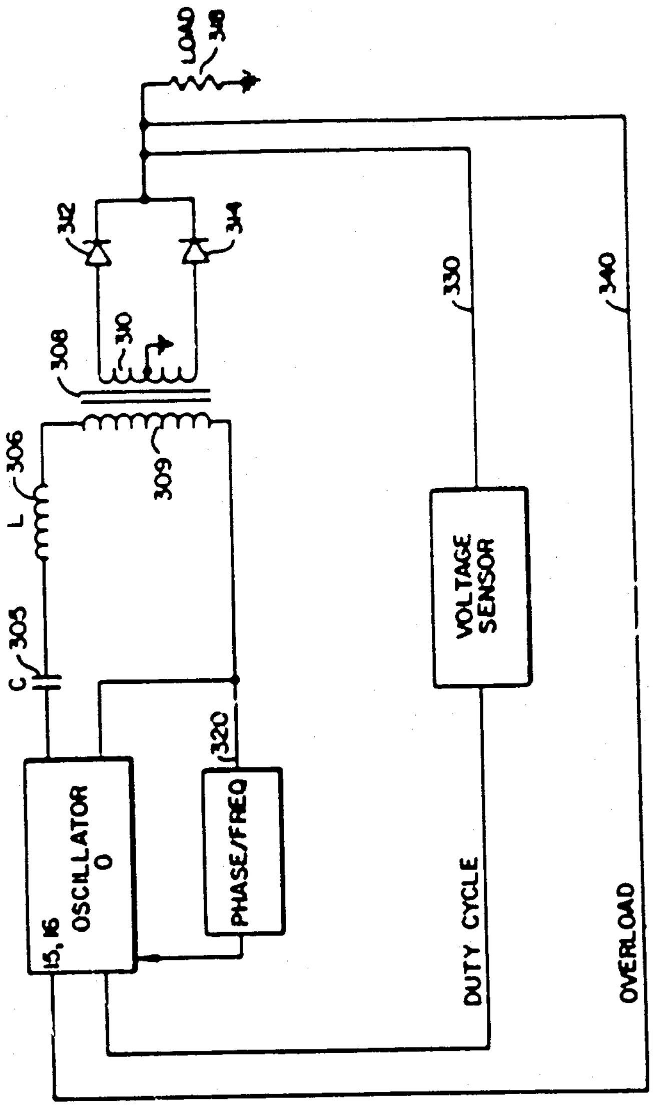

FIG. 3E shows the sample addition of the curves of FIGS. 3C and 3D to give a negative component utilized for adjusting frequency in the oscillator;

FIG. 4 is a known diagram of voltage plotted to the log of current illustrating the strike voltage and current and maintenance voltage and current accommodated in lighting neon lamps;

FIG. 5A is a circuit diagram of the voltage doubler or full wave rectifier;

FIG. 5B is a circuit diagram of the power switch drive;

FIG. 5C is a circuit diagram of the oscillating circuit;

FIG. 5D is a circuit diagram of the oscillator;

FIG. 6A is a plot of oscillator voltage attributable to switch cycle only;

FIG. 6B is a plot of oscillator voltage where commutation of the oscillator voltage is allowed; and, FIG. 7 is a diagram showing the power supply of this invention utilized at conventional voltages.

Referring to FIG. 1, a line voltage source 14 drives a frequency doubler circuit 16. This circuit includes diodes 20 placed in parallel across circuit output lines 22. A pair of capacitors 24 completes the well-understood circuit which results in voltage doubling.

For higher input voltages, it is known to close in such a circuit a switch 26 to convert the frequency doubler circuit to a full wave rectifier circuit having similar oscillation. This is desirable for European voltage formats. Output of the frequency doubler circuit is to conventional oscillator O.

Oscillator O has inputs 29 in the range of 300 volts DC at line frequencies (that is either 50 or 60 Hz). Output of the conventional oscillator is in the range of 40 kHz to a tuned RLC circuit.

Having set forth the frequency doubler and oscillator, attention may now be directed to the RLC circuit.

The 40 kHz output of oscillator O is connected to the RLC circuit at inputs 31, 32. Paired reactance elements including inductor 34 and capacitor 36 together provide the circuit with the ambient reactance. As is well known, the position of these elements may be interchanged.

Neon load 38 completes the RLC circuit. Load 38, capacitance 36 and inductance 34 together provide a total reactance which constitutes the true circuit "load." Typically, the neon is placed in parallel across the resonating circuit to one of the reactances 34, 36. The neon is here illustrated placed in parallel with the capacitance 36 at load 38.

Sampling of the circuit for control occurs at two places. First, a frequency sample 40 (here a voltmeter detection) is taken of the circuit and compared in lag or lead to the voltage of the oscillator O. Such comparison occurs at a phase comparator 42.

Secondly, current through the neon load 38 is measured at ammeter connection 50. Output of connection 50 is to a duty cycle control 52. Duty cycle control 52 functions to drive the same current through load 38, here shown in the preferable form of a neon lamp.

Having set forth the overall schematic of the power supply circuit, attention will now be addressed to the known characteristics in voltage and current operating parameters of a neon bulb. This will be shown with respect to FIG. 4.

Thereafter, and with reference to FIGS. 2 and 3A–3E, a discussion of current lag and lead to tune the circuit and duty cycle to drive the circuit will be set forth. Finally, and with respect to FIGS. 5A–5D, the actual circuitry required will be discussed.

Referring to FIG. 4, voltage is plotted linearly on the ordinate and the log of current on the abscissa. As can be seen, when current is forced through a neon tube, the voltage rises to a strike point 60. Thereafter, as current increases, voltage decreases to a maintenance voltage level denominated 62 on the ordinate. If the current is continued to be increased, the voltage 62 remains substantially constant. The current, however, increases exponentially without suitable control. There results a run away increased power consumption and uncontrolled lighting effect.

Naturally, optimum design requires that current flow be as close to the discontinuity between the sloping strike voltage curve and the horizontal and linear portion of the maintenance voltage curve. At this juncture, neon lamps output substantially optimum light with minimum power input.

As will hereinafter be explained, this disclosed power supply is tunable to maintain at an optimum current flow through the neon tube. This current flow will be maintained at an optimum even though the strike voltage and maintenance voltage change dramatically. An example may clarify.

Neon tubes typically require 1,200 volts peak to peak per foot to be optimally driven. Commercially, lengths of over 10 feet have been known to be utilized.

Taking the example of a 10 foot tube, one recognizes that 1,502 volts RMS must be utilized. When it is realized that the peak voltages encountered in a root mean square situation are as high as 4,247 volts and that the voltage is driven negatively as far as it is positively, it is immediately understood that an overall 12,000 volt fluctuation is not uncommon in a neon environment.

Take the case where a five foot tube is substituted for a 10 foot tube. Under current technology the transformers must be tailored for the load encountered.

As will hereinafter be explained with references to FIGS. 2 and 3, tuning of the circuit as well as the tailoring of the duty cycle enable the disclosed invention to operate variantly to meet these parameters.

Referring to FIG. 2, the familiar vector reactance diagram for an RLC circuit is shown for purposes of illustration. Here, a capacitance reactance vector 71, a resistance reactance vector 72 and an inductive reactance vector 73 are all illustrated.

As is known from theory, the reactance vectors change with circuit frequency. An overall reactance vector 75 results depending upon whether "lag" or "lead" is encountered.

In the example here given, the circuit voltage leads the load voltage. Vector 75 is ahead of vector 72.

If the circuit is to be tuned, vector 75 must be brought into coincidence with vector 72.

As is known from classical physics, tuning of the circuit as by increasing frequency causes a lag to be imposed upon vector 75. The vector will move until it is coincident with the load vector 72 and optimum oscillation will occur with minimum power consumption.

Referring back to FIG. 1, it will be seen that an overall frequency output is taken at voltmeter connection 40. This voltage is plotted at FIG. 3D.

Similarly, voltage oscillator O will output a voltage in the order of that shown by the squarewave of FIG. 3B. In FIG. 3B an approximate 50% duty cycle is illustrated.

The duty cycle of the voltage of FIG. 3B is generated herein by a ramp circuit shown oscillating at a frequency of 80 kHz in the example of FIG. 3A. A trigger level voltage 80 is shown operating on the successive ramps 82. Simply stated, when the voltage is ramped as at 82 and crosses the trigger level 80, the oscillator fires to generate the respective squarewave. As can plainly be seen when the voltage level 80 is lowered, firing occurs for a longer time and the duty cycle is increased. Where the level is raised, firing occurs for a shorter time and the duty cycle is decreased.

When the voltage oscillator is effectively filtered it puts out a sinusoidal voltage component in the form of that illustrated in FIG. 3.

Phase adjustment of the frequency differential such as those produced in FIG. 2 results from a comparison. This comparison is the voltage output of FIG. 3C with respect to FIG. 3D. Comparison occurs preferably at one of the zero crossings, here the rising zero crossings of the voltage generated at FIG. 3C.

Comparing FIG. 3D to FIG. 3C, we see a case of voltage lag being illustrated. Sampling at the positive zero crossing of the curve of FIG. 3C will occur at 40 kHz. By timing the sampling and integrating it, a negative component will be illustrated, such as the negative component of FIG. 3E. A voltage lag condition results.

With a voltage lag condition, the frequency must be increased. Increase in frequency is caused by shortening the individual ramps 82 of FIG. 3A. As the ramps as shortened the frequency increases, the respective voltage curves of FIG. 3C come into phase and tuning of the circuit results.

The circuit has been described for lag. It will be apparent to the reader that with opposite comparisons and opposite polarity at the integration illustrated in FIG. 3E, the circuit lead condition may likewise be corrected.

It is important to note at this point, that correction is a function of circuit control. It is not an independent function of the load, load condition or voltage for driving the power supply. Thus, it can be seen that the power supply is readily adaptable.

Having set forth the theory and timing diagram for operation, a brief description of the operating parameters of this invention can be understood.

Remembering the curve of FIG. 4 and referring to FIG. 1, it will be seen immediately that current sensor 50 and the duty cycle control 52 will force the circuit to reach a rapid strike voltage 60 and thereafter cause the current to settle immediately upon realizing the linear maintenance voltage. Typically, current flow will be adjusted so that the current settles with the voltage maintained at the maintenance level. Minimum power loss in light operation will be incurred.

Additionally, it can be seen that should the neon load 38 have its voltage requirements drastically altered, again the circuit will oscillate with voltage sufficient to drive the required current through the load 38. The output of the power supply will vary up to capacity with sufficient voltage to drive the neon load 38.

Action with line voltage changing within reasonable limits will be similar. Circuit tuning will occur on an automated basis.

Having discussed the operating parameters, attention will now be delayed to the actual circuitry.

Referring to FIG. 5A, power in is on lines 101, 102 with a ground connection at 103. A standard integrated bridge rectifier 105 provides a nominal 330 volts DC. At it is known in the art, this circuit can be configured as a voltage doubler with a link 108 open for 115 volts 60 hertz current. This link can be cut or left out for 230 volt 50 hertz current. As will hereinafter be set forth, the circuit is widely responsive to line voltage variation.

The circuit includes doubler capacitors 109 and 110 operating on the respective outputs of the rectifier. Radio frequency blocking capacitor 111, 112 together with blocking inductors 114, 115 prevent the propagation of radio frequencies to the line voltage source.

This circuit is powered with analog logic and started with analog logic. It has therefore been found desirable to provide a starter circuit 120. Starter circuit includes a step down resistor 122 coupled to ground across a 15 volt Zener diode 124. The 15 volt reference level of the Zener diode is tied to the gate 125 of an emitter follower transistor 126 which through a blocking diode 127 provides a start-up power voltage. As will hereinafter become more apparent, once power from the normal power supply appears on line 128, diode 127 blocks off the emitter transistor 126; current no longer flows through the start-up circuit.

Having explained the starter circuit, reference now will be had to the power switch drive circuit of FIG. 5B. In this discussion, it will be assumed that the oscillator is outputting the proper frequency and duty cycle of signal. The adjustment of the frequency in duty cycle will be later discussed.

The oscillator receives an output drive on line 130. Line 130 drives paired transformers 131, 132.

A discussion will be had of the drivers relating to transformer 131. Since the driver for transformer 132 is in all cases practically identical, this discussion should be simplified.

A primary coil 133 energizes core 134 of transformer 131 and typically drives the secondary coil 135 positive at end 136. When line 136 goes positive, gate 139 of field effect transistor 140 (FET 140) is turned on.

Referring to the diagram of FIG. 6A, one can see the resultant wave shape commencing at 142 and rising to edge 143.

The oscillation at 133 will cease. Core energy will be dumped through coil 145 and diode 146 back into the oscillating circuit. The transformer 131 will be demagnetized.

This will cause point 136 to go negative and point 137 to go positive relative to coil 135. With line 137 positive, diode 148 will conduct to open field effect transistor 150. Field effect transistor 150 will drain gate 139 of field effect transistor 140 clamping the FET shut and preventing noise from opening the circuit. A capacitor 152 will serve to hold field effect transistor 150 in the on position. At the same time, field effect transistor 154 will be in the off state. The circuit will remain clamped until the next positive portion of the oscillator is encountered.

In practice, the diode 148 forms a portion of the field effect transistor 154. Likewise the capacitance 152 forms a portion of the field effect transistor 150. Since both of these field effect transistors 150, 154 appear as if they have a capacitance and diode placed across them, they in effect maintain the switch 140 in the closed position.

Stopping here, the reader can see how the wave form at FIG. 6A is generated. Unfortunately, if such a wave form were allowed to drive the circuit here disclosed, not only would hard edges generating deleterious Fourier components be experienced, but there would be overall danger of burning out this circuit. Specifically, the diodes 170, 172 on either side of the circuit input 169 have 200 nanosecond reverse time. This 200 nanosecond reverse time compares to a 50 nanosecond interval required to damage beyond repair the field effect transistors 140, 145. Therefore, a way must be found to commutate the circulating current.

When the field effect transistors 140, 145 are clamped shut, current, flows through the respective diodes 170, 172. When field effect transistor 140 is closed, diode 172 permits current flow across inductor 173 to reach the wave form of FIG. 6B. Likewise when field effect transistor 145 is closed, diode 170 permits current flow across inductance 173 to generate the wave form.

There results across a center tap 180 and balanced capacitors 181, 182 a 165 volt swing for driving the RLC circuit of this invention.

The drive to FET 145 is similar to the drive to FET 140. Two details are worthy of note.

First, there is a line to help sample current flow denominated 190.

Second, there is a small line 192 for driving of a power supply for the control circuitry.

Having set forth the power switch drive circuit, attention will now be devoted to FIG. 5C.

The RLC circuit is illustrated in FIG. 5C. Specifically, a neon 200 is shown in parallel with an inductor 205. A capacitance 208 completes the RLC circuit.

The main system power supply is illustrated at 210. Specifically, a transformer T1 passes its output through simple rectifiers 212, 214. The standard power supply voltage is generated. It is this generated voltage which provides the power supply which blocks out diode 127 to disable the starting power supply illustrated with respect to FIG. 5A.

The reader will remember that it is necessary to measure the circulating current. Accordingly, a second transformer T2 provides a current sensing transformer output 220 which is input to an integrator 222.

Referring to line 190 at tap 230, a pulse or spike wave form appears. This pulse opens a gate to transistor 235 on the negative edge only causing sample pulses, the spike voltage and sample voltages being illustrated in detail 231 and 232. The transistor outputs through a sample line 240 to the positive side of integrating amplifier 222. A sample hold capacitor 260 averages the voltage to the input side of the amplifier 222. Dependent upon the time of sample as illustrated with respect to FIGS. 3A–3E, the output 270 of the amplifier will be either positive or negative. This output will occur along line 280.

As an aside, it is necessary for the gate 241 inputting to one leg of the amplifier 222 to be provided with a standard circuit having a positive voltage at input 280 and a negative voltage at input 282. In order to provide this negative voltage, a −20 volt doubler 285 is provided powered from line 192. As this doubler is conventional, it will not further be explained here.

Referring further to FIG. 5C, a load current sensing and maintenance transformer T3 is illustrated. Transformer T3 has an output at line 320 again to the input 325 of an amplifier. A 20 kHz active filter is provided the amplifier so that the necessary duty cycle control line voltage appears on line 330.

In sum and flowing as outputs from the portion of the apparatus shown in FIG. 5C, a voltage 280 is present (+or −with magnitude) to speed up and/or slow down the oscillator.

At the same time, a constant level of duty cycle control voltage appears at line 330. This duty cycle control voltage enables the duty cycle of the switching transistors.

Completion of the understanding of this circuit may now be had with reference to FIGS. 5D.

A TL494 integrated circuit 350 with pin connections actually shown has an input of the voltage to drive a built-in oscillator. This voltage controls the period of oscillation, which period is output on drive line 352 to power the power switch drive at line 130 (see FIG. 5B). At the same time, the duty cycle voltage appears on line 330 and is input to the pin 1 of circuit 350 which constitutes the input leg of the amplifier. This is amplified to an output voltage at pin 3 on line 354 which controls the duty cycle.

Regarding the remainder of the circuitry surrounding integrated circuit 350, this is conventional wiring to a TL494 being utilized as a combination oscillator and duty cycle drive. It will not further be discussed herein.

The reader will appreciate that the disclosed circuit can be used for a conventional power supply. Referring to FIG. 7 such a circuit is illustrated. Oscillator O is shown connected to a classical RLC circuit including capacitor 305, inductance 306 and a transformer 308. Typically, transformer 308 is a simple toroidal stepdown transformer with a center tab to ground. The transformer primary 309 passes energy to the center tap transformer 310. Two diodes 312, 314 drive a load 318.

Control is provided as before. Broadly, tuning of the circuit occurs at a frequency control 320. Voltage is maintained by a voltage sensor 330 adjusting the duty cycle as before. An overload sensor 340 is provided which connects to pins 15 and 16 of integrated circuit 350. These pins have the effect of shutting the oscillator down in case the power supply is short circuited.

It will be noted with respect to FIG. 7 that the load is in series with the two reactive elements.

The paired diodes 312, 314 operate up to five times the frequency that they could operate in conventional switching. This is because there is a sine wave present in the circuit. Reverse recovery problems are obviated. Those skilled in the art will appreciate that a rectifier at 100 volts PIV capable of 12 amps if available would cost at least twenty times the cost of a conventional 300 nanosecond rectifier with 100 PAIV at 12 volts. In short, the disclosed circuit utilizes ordinary slow closing rectifiers with the sine wave drive disclosed. It will additionally be observed that transformer 308 can be toroidal since there is no DC component in the output.

Those having skill in the art will realize that this circuit will have many variations. For example, we have shown control at integrated circuit 350 by varying the frequency and voltage into the chip. The reader will appreciate that the capacitor to pin 5 of integrated circuit 350 could as well be varied to effect circuit control.

Having seen the disclosure, it will be noted that a dwell RLC circuit could be constructed using one driving switch from the oscillator. In this case, the inductance of the RLC circuit would be center tapped with one end grounded. Driving could occur, by way of example, at the center tap to resonate the circuit. Such a construction is not preferred.

What is claimed is:

1. A tuned radio frequency power supply for powering a load comprising in combination:

an oscillator having a variable frequency and variable duty cycle;

an RLC circuit having a load connected thereto and including a first inductance reactance element and a second capacitance reactance element;

a current sensor connected to the load for sensing the current sufficient to drive the load independent of phase, said sensor outputting to the duty cycle control to cause said oscillator to have a duty cycle sufficient to force a required level of current through the RLC circuit;

a frequency sensor connected across the current flow in the RLC circuit outputting to a phase comparator, said frequency sensor being independent of load;

a phase comparator for comparing the phase of the oscillator with the phase of the circuit for changing the frequency of the oscillator to tune said circuit for minimum reactance load and maximum resistive load independent of load.

2. The invention of claim 1 and wherein a load is placed in parallel with one reactance element in said RLC circuit.

3. The invention of claim 1 and wherein said load is placed in series in said RLC circuit.

4. The invention of claim 3 and including a transformer having a primary winding and a secondary winding placed in series in said RLC circuit, said transformer connected at said primary winding to said RLC circuit and at said secondary winding to a load.

5. The invention of claim 4 and wherein said transformer secondary is center tapped and connected to first and second diodes, said diodes outputting to a load.

6. A tuned radio frequency power supply for powering a load comprising in combination:

an oscillator having variable frequency and variable duty cycle;

an RLC circuit having a load and first and second reactance elements;

a load connected to said RLC circuit including a transformer having a primary within said RLC second circuit and a secondary said transformer secondary outputting to the load;

a voltage sensor connected to the secondary of said transformer for sensing a voltage therefrom independent of phase and varying the duty cycle of said oscillator to a sufficient level to force a required current through the RLC circuit;

a frequency sensor connected across said RLC circuit outputting to a phase comparator independent of load; and, a phase comparator for comparing the phase of said oscillator with the phase of said circuit for changing the frequency in said oscillator to tune said circuit for minimum reactance load to maximum resistive load.

7. The invention of claim 6 and wherein said oscillator outputs to said RLC circuit through a transformer;

said transformer includes paired field effect transistor switches;

means for clamping said paired switches in a open position responsive to the duty cycle of said oscillator; and Zener diode communtations elements for permitting the oscillator current to be maintained in a sinusoidal form after opening of said transistor switches.

8. In a power supply having an oscillator driving an RLC circuit with a load connected to said RLC circuit, the improvement providing an oscillator having a variable frequency and a variable duty cycle;

an output function sensor connected in series with the load for sensing output independent of phase sufficient to drive the load, said sensor outputting to the duty cycle control of said oscillator to cause said oscillator to have a duty cycle sufficient to force a required level of output through the RLC circuit;

a frequency sensor connected across the RLC circuit outputting to a phase comparator independent of load; and, a phase comparator for comparing the phase of said oscillator with the phase of said circuit for changing the frequency of said oscillator to tune said circuit for minimum reactance load and maximum resistive load.

9. The invention of claim 8 and wherein said oscillator has first and second transistor switches;

means connected to said transistor switches and responsive to the duty cycle of said oscillator for clamping said transistor switches in the shut position at the end of the duty cycle of said oscillator.

* * * * *